Dec. 9, 1969        G. FRANZEN        3,482,386
SPINDLE BEARING
Filed Jan. 19, 1968
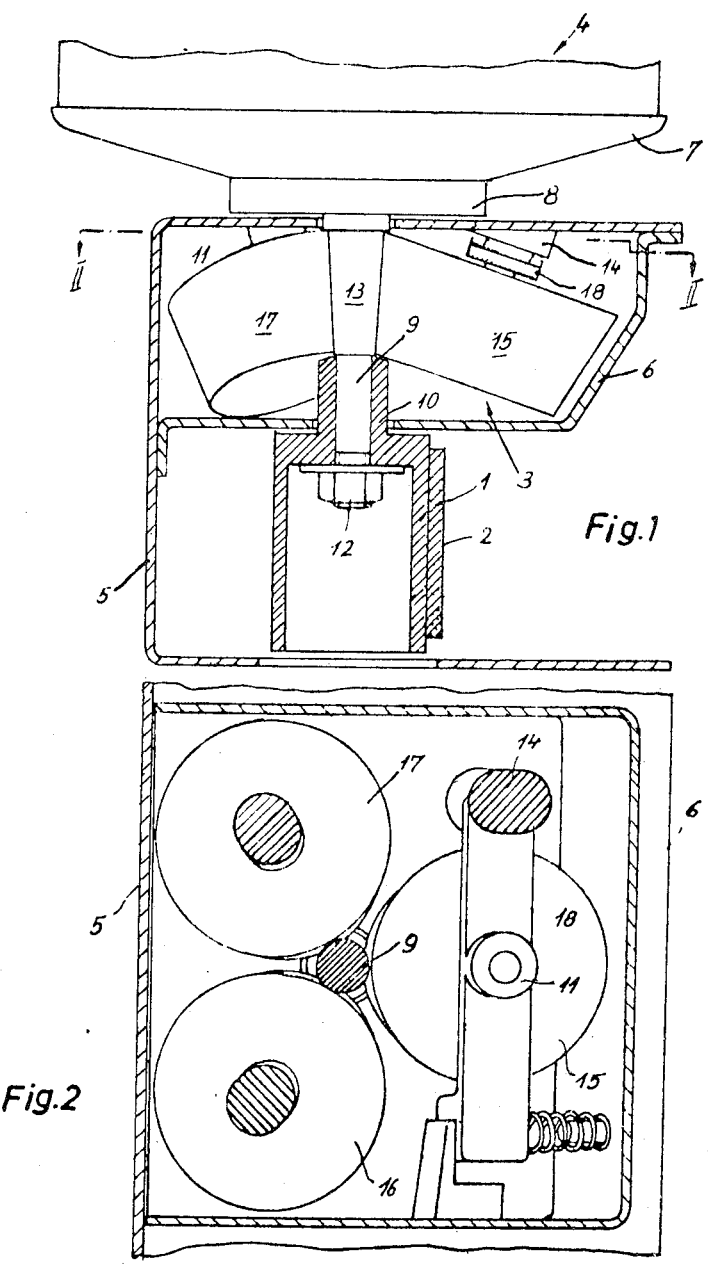
INVENTOR
Gustav Franzen

United States Patent Office 3,482,386
Patented Dec. 9, 1969

3,482,386
SPINDLE BEARING
Gustav Franzen, Neersen, near Krefeld, Germany, assignor to Palitex Project-Company GmbH, Krefeld, Germany
Filed Jan. 19, 1968, Ser. No. 699,238
Claims priority, application Germany, Jan. 25, 1967,
P 41,279
Int. Cl. D01h *1/10, 7/86, 7/04*
U.S. Cl. 57—58.84                                   1 Claim

ABSTRACT OF THE DISCLOSURE

At least three stationarily journalled conically tapered supporting rollers of a spindle bearing engage a downwardly tapering spindle shank portion for a machine having a two-for-one twisting and spinning spindle means and having a thread storage disc and a whorl connected to the spindle means shank between which the tapering supporting rollers are arranged below the thread storage disc. The tapered supporting rollers totalling at least three in number center and journal the tapering spindle shank portion downwardly perpendicularly therebetween for increased life span at considerable increase in the speed and the spindle weight.

---

The present invention relates to a spindle bearing. The anti-friction bearings employed in connection with the spindles of spinning or twisting machines frequently limit the maximum spindle speeds obtainable in practice. The reasons for this fact are seen, on one hand, in lubricating problems at high spindle speed, and on the other hand are due to the occurrence of oscillations caused by the fact that the spindle mass changes with the unwinding and winding-up of the thread and that with such unwinding or winding-up, the thread acts upon the spindle in a radial direction with varying tension. An asymmetric winding with regard to the axis of rotation frequently also brings about that the axis of rotation of the spindle does not precisely coincide with the centroidal axis of the spindle as it should be.

It is for this reason that most of the heretofore known spindles, particularly those of greater length with a yarn body rotating thereon are to a certain extent journalled in a radially yieldable manner so that the spindle shank is surrounded by a so-called collar or journal bearing, whereas the lower shank end has its tip supported in a radially yieldable step bearing or pivot bearing whereby the oscillations at the foot end will be suppressed.

With spindles in which the yarn body does not rotate and, therefore, the rotating part forms a mass which is relatively precisely balanced out and which does not change during the spinning or twisting operation, as is the case, for instance, with spindle rotors of two-for-one twisting spindles on which rests the delivery bobbin carrier with delivery bobbin secured against rotation, it is the speed of the spindle rotor in combination with the resting weight of delivery bobbin carrier and delivery bobbin which represents the determining influential factor for the design and dimensioning of the bearing. Therefore, in part, heretofore known spindles of the type involved are surrounded by anti-friction bearings only while a foot-step bearing has been omitted, said anti-friction bearings also supporting the spindle in axial direction.

The diameter of the spindle shank is determined by the spindle weight but at the same time is limited by the speed because, as a rule, with increasing speed, the diameter of the anti-friction bearing has to be reduced correspondingly. The anti-friction bearings thus limit on one hand the speed, and on the other hand, the spindle weight.

Therefore, when employing spindle bearings of the heretofore known type, definite limits are set to the endeavor of increasing the spindle speed and the spindle weight.

It is an object of the present invention to provide a spindle bearing for spinning and twisting spindles without a foot-step bearing, which will allow a considerable increase in the speed and the spindle weight over heretofore known spindle bearings.

It is another object of this invention to provide a spindle bearing for spinning and twisting spindles which, while omitting a foot-step bearing, will bring about an increased life span of such bearing.

These and other objects and advantages of the invention will appear more clearly from the following specification in connection with the accompanying drawing, in which:

FIGURE 1 is a section through a spindle rail with a bearing therein for a two-for-one twisting spindle;

FIGURE 2 represents a section along the line II—II of FIGURE 1 within the area of a spindle bearing.

The spindle bearing according to the present invention which does not have a foot-step bearing, is characterized in that the spindle bearing is formed by at least three stationarily mounted tapered supporting rollers which are substantially uniformly distributed about the spindle shank, said spindle shank conically tapering in cross-section in the supporting direction.

Inasmuch as the spindle shank rests axially on tapered supporting rollers while simultaneously being radially supported, the spindle shank will center itself automatically while its circumferential speed will determine the speed of the supporting rollers, so that the speed of rotation of said supporting rollers can be kept considerably lower than the spindle speed, provided the roller diameter is selected accordingly.

Since a total of three supporting rollers have to carry the spindle weight, the load of the individual bearings is relatively low, so that the anti-friction bearings of the tapered supporting rollers can likewise be small and will permit a correspondingly high speed of rotation.

Finally, a considerable assembly advantage is obtained by the arrangement according to the present invention inasmuch as the insertion of the spindle shank between the tapered supporting rollers can be effected freely from the top, with the result that the spindle shank with the parts supported thereby can easily be exchanged without the necessity of exchanging the bearing in the spindle rail.

In order to design the bearing so that it will be radially yieldable to a certain extent and will be able, without undue load on the individual supporting rollers to absorb oscillations of the rotor while the rotor shaft will center itself with regard to the centroidal axis, it is possible, according to a further development of the invention to journal one of the tapered supporting rollers so as to be resilient in radial direction.

If a two-for-one twisting spindle is journalled with a whorl drive, according to a further development of the invention, the tapered supporting rollers may be arranged below the thread storage disc between the latter and the whorl connected to the spindle shank. Such an arrangement brings about the advantage that the center of gravity of the spindle is closer to the bearing than is the case with heretofore known bearings. This, in turn, results in a more quiet movement, which means that the occurring oscillations are considerably reduced.

Referring now to the drawings in detail, the arrangement shown in FIGS. 1 and 2 comprises a two-for-one twisting spindle 4 of which only the lower marginal portion of the spindle pot is shown, which is surrounded by an overflow dish 7 having a thread storage disc 8 connected thereto. FIG. 1 furthermore shows the spindle shank 9 with the whorl 1 which, together with the spindle shank 9 and the thread storage disc 8 and the overflow dish 7 forms the spindle rotor.

Of the above-mentioned parts, the spindle shank 9 and the whorl 1 are located within the spindle rail 5, which latter has a U-shaped cross-section, the base leg of said U-shaped cross-section extending toward the servicing side. The whorl 1 is engaged by a tangential driving belt 2. The spindle bearing, generally designated 3 and forming the bearing for the spindle rotor, is located directly below the upper leg of the spindle rail 5 and is substantially dust-tight closed by a hood 6 connected to the spindle rail 5.

The bearing 3 comprises three tapered supporting rollers 15, 16 and 17 the bearing studs of which are journalled in anti-friction bearings, not shown, which are located in bearing studs 11 arranged at the inner side of the upper leg of the spindle rail 5.

The axes of the bearings are inclined toward each other in such a way that the tapered supporting rollers 15, 16 and 17 by means of their mantle surface within their contact area roll in a slip-free manner on the conical section 13 of the spindle shank 9, while the spindle shank 9, by means of its conical section 13, rests axially and radially on the mantle surface of the supporting rollers 15, 16 and 17.

The free end of the spindle shank 9 is cylindrical. The whorl 1 is by means of its plug-shaped hub 10 placed upon said cylindrical end and by means of a nut 12 is non-rotatably connected to said cylindrical end, so that when the whorl 1 rotates, also the spindle shank 9 will rotate and thereby also the spindle rotor. When the spindle rotor rotates, it rotates the tapered supporting rollers 15, 16 and 17. In this way, due to the selection of a corresponding large diameter of the tapered supporting rollers, it can be assured that the speed of said supporting rollers will be relatively low in comparison to the spindle speed, whereby a relatively high spindle speed is made possible without over-loading the bearings. At least, the mantle surfaces of the supporting rollers 15, 16 and 17 may consist of the same material as the spindle shank 9, for instance, of steel or another metallic or non-metallic material. Particularly suitable are high-resistant, for instance, sintered bearing materials. The material may be self-lubricating, which will make servicing outside the customary periodic machine cleaning, superfluous.

It is furthermore advantageous that the weight of the spindle is absorbed by three tapered supporting rollers so that the bearings thereof have to support only one-third of the total spindle weight. Also in this way, an overload of the bearing will be avoided.

As is furthermore evident from FIG. 1, the insertion of the spindle shank 9 into the bearing 3 is extremely simple. There also exists the possibility, without exchanging the bearing 3, to exchange the spindle rotor for another one provided that the spindle shank 9 has the corresponding dimensions of the bearing 3. For exchanging or assembling, it is merely necessary to detach the whorl from the spindle shank 9 which subsequently, after the insertion of the spindle shank 9 in the bearing 3, is properly connected.

As will be evident from FIG. 2, only the tapered supporting rollers 16 and 17 are stationarily mounted on the upper leg of the spindle rail 5, whereas the tapered supporting roller 15 is adapted radially resiliently to deviate. To this end, the bearing stud 11 is mounted on a pivotable arm 18 which is linked to the stud 14 of the upper leg of the spindle rail 5 and rests with its other end, through the intervention of a pressure spring 19 on a wall of the hood 6, the helical spring 19 surrounding the pin 20 for purposes of centering.

The elastically yieldable journalling of the tapered supporting roller 15 facilitates the insertion of the spindle shank 9 into the bearing 3 and makes possible a certain radial deviation of the spindle shank 9, if such should occur in view of occurring oscillations.

In contradistinction to the embodiment shown in the drawing, the spindle rail 5 may also be closed on all sides or may, for instance, receive only the bearings 3 of the spindle, whereas whorl 1 freely extends below the spindle rail. Furthermore, in contradistinction to the embodiment shown in the drawing, there also exists the possibility of providing the whorl above the bearing 3 or, instead of a whorl drive, to employ, for instance, a gear drive of any standard design.

What I claim is:

1. In combination with a machine having two-for-one twisting and spinning spindle means and having a thread storage disc, a spindle shank including a downwardly tapering portion, a whorl connected to the spindle shank and a spindle bearing which includes: at least three stationarily journalled conically tapered supporting rollers substantially uniformly distributed around and receiving therebetween said downwardly tapering spindle shank portion while engaging said spindle shank portion, said tapering supporting rollers being arranged below said thread storage disc and between said thread storage disc and said whorl, said conically tapered supporting rollers dividing journalling of said downwardly tapering spindle shank portion therebetween in a self-centering journalling of the spindle means perpendicularly and downwardly supported.

References Cited

UNITED STATES PATENTS

| | | | |
|---|---|---|---|
| 1,218,311 | 3/1917 | Perkins | 308—231 |
| 1,459,452 | 6/1923 | Souvielle | 308—231 |
| 2,258,267 | 10/1941 | Shimer | 308—231 |
| 2,575,476 | 11/1951 | Truitt | 57—58.68 |
| 2,794,692 | 6/1957 | Nemeth | 308—203 |
| 3,316,038 | 4/1967 | Vigh | 308—203 |

FOREIGN PATENTS

| | | |
|---|---|---|
| 1,050,886 | 2/1959 | Germany. |

MERVIN STEIN, Primary Examiner

WERNER H. SCHROEDER, Assistant Examiner

U.S. Cl. X.R.

57—130; 308—143, 152, 231